United States Patent
Takeyama

(10) Patent No.: US 10,754,224 B2
(45) Date of Patent: Aug. 25, 2020

(54) WAVELENGTH CONVERSION DEVICE, TRANSMISSION DEVICE, AND TRANSMISSION SYSTEM

(71) Applicant: FUJITSU LIMITED, Kawasaki-shi, Kanagawa (JP)

(72) Inventor: Tomoaki Takeyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/389,093

(22) Filed: Apr. 19, 2019

(65) Prior Publication Data
US 2019/0353978 A1 Nov. 21, 2019

(30) Foreign Application Priority Data
May 18, 2018 (JP) .................................. 2018-096131

(51) Int. Cl.
*G02F 1/35* (2006.01)
*H04B 10/548* (2013.01)
*H04B 10/50* (2013.01)

(52) U.S. Cl.
CPC ......... *G02F 1/3536* (2013.01); *H04B 10/505* (2013.01); *H04B 10/548* (2013.01); *G02F 2203/50* (2013.01)

(58) Field of Classification Search
None
See application file for complete search history.

(56) References Cited

U.S. PATENT DOCUMENTS

| | | | |
|---|---|---|---|
| 2001/0007509 A1* | 7/2001 | Aso ........................ | G02F 2/004 359/326 |
| 2006/0045445 A1* | 3/2006 | Watanabe ............. | G02F 1/3515 385/122 |
| 2006/0159463 A1* | 7/2006 | Futami ..................... | G01J 11/00 398/152 |
| 2014/0119743 A1* | 5/2014 | Yang .................... | H04B 10/293 398/175 |
| 2017/0307957 A1 | 10/2017 | Kato et al. | |

FOREIGN PATENT DOCUMENTS

| | | |
|---|---|---|
| JP | 4-45428 | 2/1992 |
| JP | 2004-347830 | 12/2004 |
| JP | 2017-194576 | 10/2017 |

* cited by examiner

*Primary Examiner* — Casey L Kretzer
(74) *Attorney, Agent, or Firm* — Staas & Halsey LLP

(57) ABSTRACT

A wavelength conversion device includes a light source configured to output an excitation light beam, a modulator configured to phase-modulate the excitation light beam, a polarization adjustor configured to adjust a polarization angle of the excitation light beam to 45 degrees or 135 degrees with respect to a polarization angle of a signal light beam, and a nonlinear medium configured to generate four-wave mixing of the excitation light beam whose polarization angle is adjusted and the signal light beam to generate an idler light beam having a frequency corresponding to a difference between frequencies of the signal light beam and the excitation light beam from the signal light beam.

12 Claims, 13 Drawing Sheets

FIG. 4
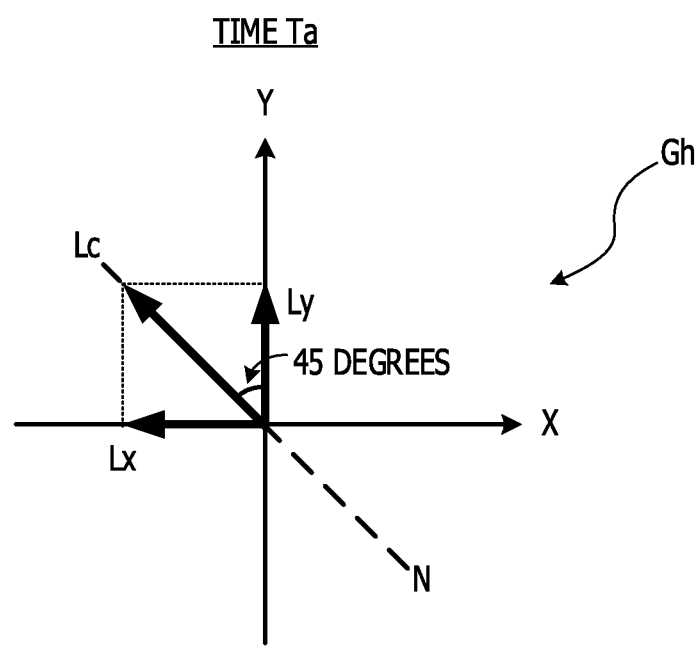
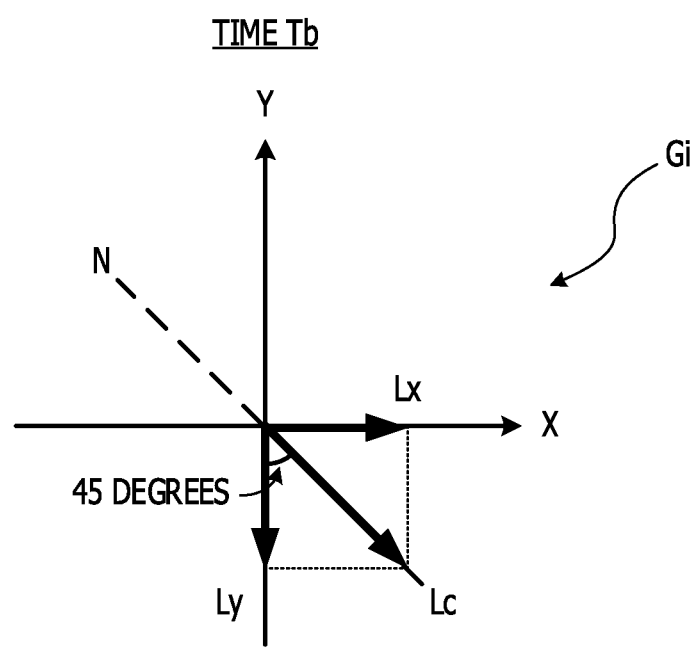

WAVELENGTH CONVERSION DEVICE, TRANSMISSION DEVICE, AND TRANSMISSION SYSTEM

CROSS-REFERENCE TO RELATED APPLICATION

This application is based upon and claims the benefit of priority of the prior Japanese Patent Application No. 2018-96131, filed on May 18, 2018, the entire contents of which are incorporated herein by reference.

FIELD

The embodiment discussed herein is related to a wavelength conversion device, a transmission device, and a transmission system.

BACKGROUND

A technique of converting the optical frequency by making use of cross phase modulation (XPM) that is one of nonlinear optical effects has been known (For example, Japanese Laid-open Patent Publication No. 2017-194576). Another technique of simultaneously converting a wavelength-multiplexed light beam in a wavelength band into a wavelength-multiplexed light beam in another wavelength band by making use of four-wave mixing (FWM) that is one of nonlinear optical effects has also studied and developed.

For example, a related art is disclosed in Japanese Laid-open Patent Publication No. 2017-194576.

In the above-mentioned wide-band wavelength conversion using four-wave mixing, to match the rate of each signal light beam before and after conversion with the rate of excitation light beam, it is required for satisfying phase matching conditions. For example, in the case of wavelength conversion by nondegenerative four-wave mixing using two excitation light beams having different wavelengths, it is required to satisfy the condition that the zero dispersion wavelength is located at the center of each wavelength band before and after conversion and the condition that a dispersion slope is zero in each wavelength band before and after conversion.

However, for example, in consideration of discrepancies in individual pieces, it is difficult to manufacture a dispersion-shifted optical fiber generating four-wave mixing so as to satisfy the above-mentioned two conditions. When the phase matching conditions are not satisfied, a difference occurs between the rate of each signal light beam before and after conversion and the rate of the excitation light beam, disadvantageously lowering the wavelength conversion efficiency.

In light of the above situation, it is desirable to provide a wavelength conversion device, a transmission device, and a transmission system that readily achieve highly-efficient wavelength conversion.

SUMMARY

According to an aspect of the embodiments, a wavelength conversion device includes a light source configured to output an excitation light beam, a modulator configured to phase-modulate the excitation light beam, a polarization adjustor configured to adjust a polarization angle of the excitation light beam to 45 degrees or 135 degrees with respect to a polarization angle of a signal light beam, and a nonlinear medium configured to generate four-wave mixing of the excitation light beam whose polarization angle is adjusted and the signal light beam to generate an idler light beam having a frequency corresponding to a difference between frequencies of the signal light beam and the excitation light beam from the signal light beam.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view illustrating an example of an excitation light beam combined from excitation light beams;

DESCRIPTION OF EMBODIMENTS

Figure 1:
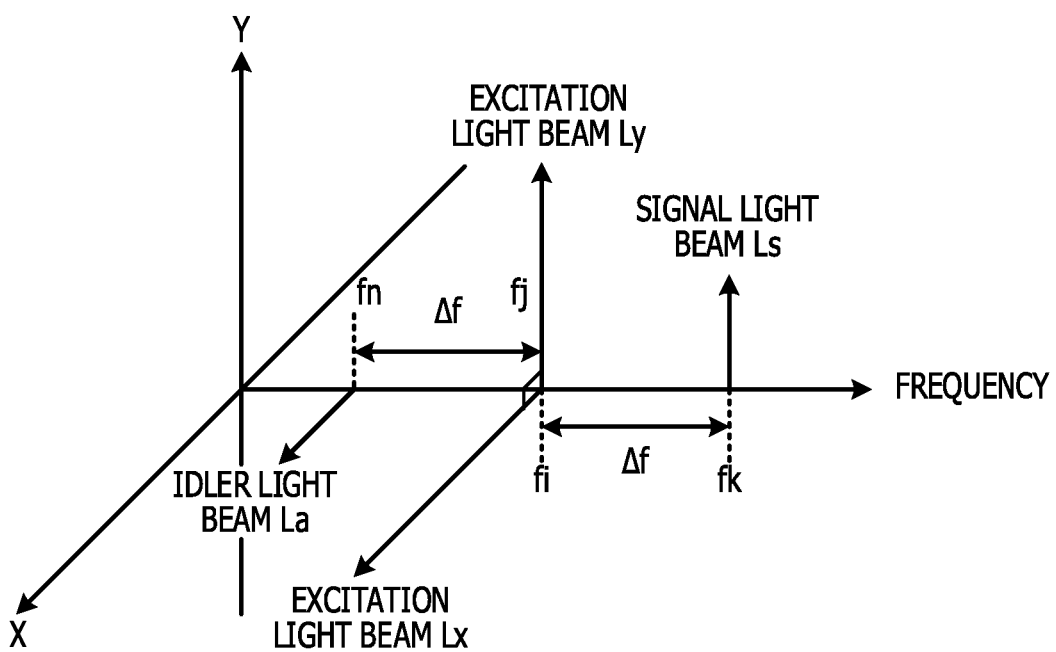
FIG. 1 is a view illustrating an example of the state where an idler light beam is generated from a signal light beam and two excitation light beams.

FIG. 1 is a view illustrating an example of the state where an idler light beam La is generated from a signal light beam Ls and two excitation light beams Lx, Ly. For the signal light beam Ls, the excitation light beams Lx, Ly, and the idler light beam La, FIG. 1 illustrates an X axis and a Y axis, which are orthogonal to each other, as polarization axes defining polarization directions, and a frequency axis defining the optical center frequency.

The signal light beam Ls modulates light based on data about a signal to be transmitted, and includes only a Y-axis polarization component. The excitation light beam Lx has an X-axis polarization component, and the excitation light beam Ly has a Y-axis polarization component. That is, the excitation light beams Lx, Ly are orthogonal to each other.

The signal light beam Ls and the excitation light beams Lx, Ly are inputted to a nonlinear optical medium such as the dispersion-shifted optical fiber, thereby generating four-wave mixing. Due to a difference frequency, beat light is generated between the signal light beam Ls and the excitation light beam Ly that have the same polarization direction. The excitation light beam Lx generates the idler light beam La having the same polarization component due to the effect of the beat light.

$$fn = fi + (fj - fk) \quad (1)$$

A center frequency fn of idler light beam, a center frequency fi of the excitation light beam Lx, a center frequency fj of the excitation light beam Ly, and a center frequency fk of the signal light beam Ls satisfy the relation expressed by the above-mentioned formula (1). Here, when the center frequencies fi, fj of the excitation light beams Lx, Ly are the same as each other, a center frequency fn of the idler light beam is symmetrically located on with respect to the excitation light beams Lx, Ly on the frequency axis. Thus, a difference $\Delta f$ between the center frequency fk of the signal light beam Ls and the center frequencies fi, fj of the excitation light beams Lx, Ly is equal to a difference $\Delta f$ between the center frequency fn of the idler light beam La and the center frequencies fi, fj of the excitation light beams Lx, Ly.

As described above, when the excitation light beams Lx, Ly that are orthogonal to each other and the signal light beam Ls are inputted to the nonlinear optical medium, four-wave mixing occurs such that the idler light beam La that is orthogonal to the signal light beam Ls may be generated on the frequency axis away from the signal light beam Ls by $2 \times \Delta f$. This enables wavelength conversion making use of a frequency change from the signal light beam Ls to the idler light beam La.

However, when the excitation light beams Lx, Ly having large power are inputted to the nonlinear optical medium, stimulated brillouin scattering (SBS) as a nonlinear phenomenon occurs. As a result, the excitation light beams Lx, Ly may be reflected and may not be inputted to the nonlinear optical medium while keeping sufficient power. On the contrary, for example, when the excitation light beams Lx, Ly are phase-modulated and then, inputted to the nonlinear optical medium, the spectral width of the excitation light beams Lx, Ly increases to suppress the occurrence of the SBS. However, the phase modulation component is superimposed on the idler light beam La, destroying signal data.

Figure 2:
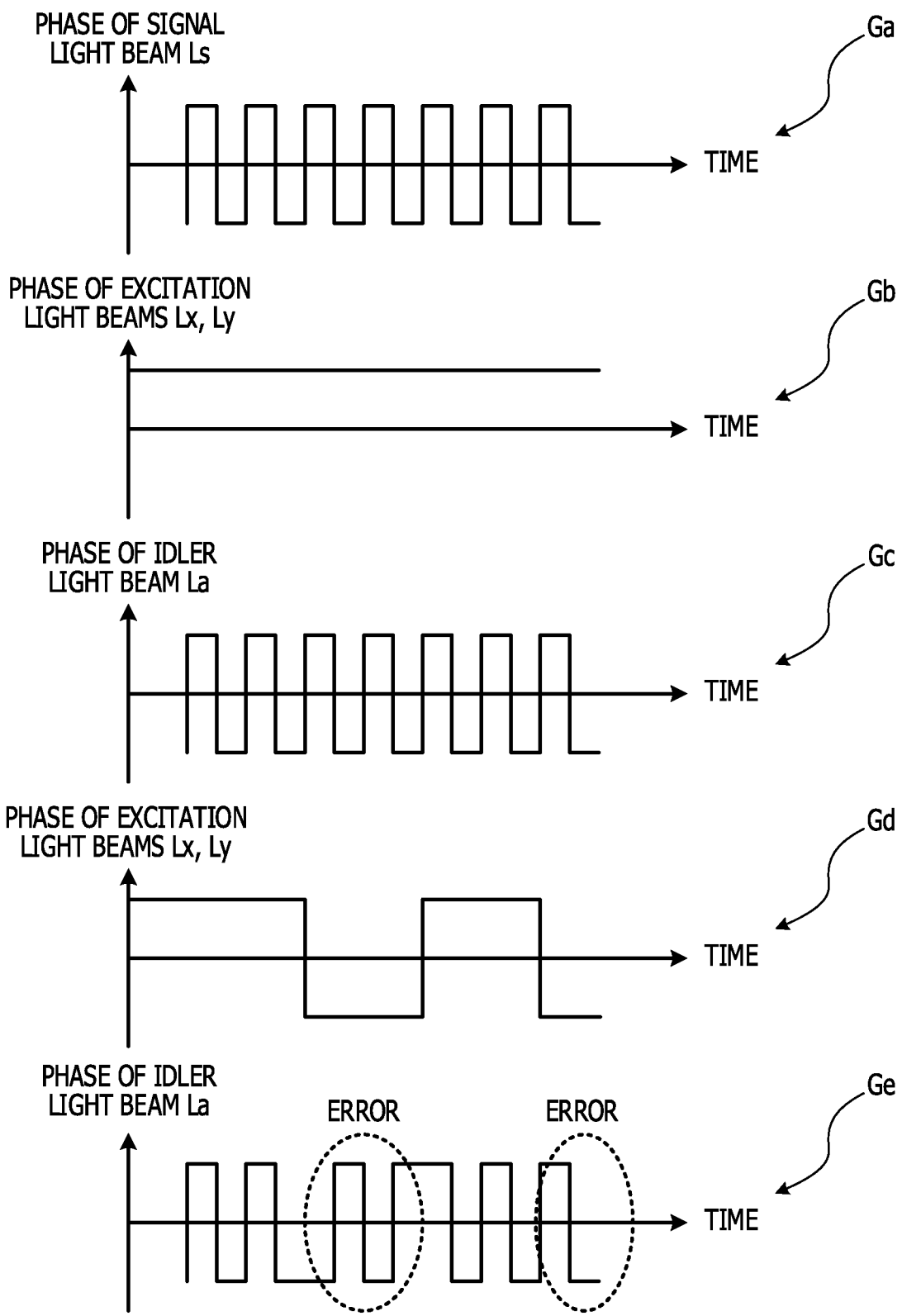
FIG. 2 is a view illustrating the occurrence of an error caused by phase modulation of the excitation light beams.

FIG. 2 is a view illustrating an example of the occurrence of an error caused by phase modulation of the excitation light beams Lx, Ly. In graphs Ga to Ge in FIG. 2, a horizontal axis represents time, and a vertical axis represents phase.

The graph Ga illustrates an example of a phase change in the signal light beam Ls. The graph Gb illustrates an example of a phase change in the excitation light beams Lx, Ly that are not subjected to phase modulation, and the graph Gc illustrates an example of a phase change in the idler light beam La generated from the excitation light beams Lx, Ly that are not subjected to phase modulation. When the excitation light beams Lx, Ly are not subjected to phase modulation, the phase of the idler light beam La changes like the phase of the signal light beam Ls.

The graph Gd illustrates an example of a phase change in the excitation light beams Lx, Ly subjected to phase modulation, and the graph Ge illustrates an example of a phase change in the idler light beam La generated from the excitation light beams Lx, Ly subjected to phase modulation. The phases of the excitation light beams Lx, Ly change in sync with each other (that is, changes with the same phase). When the phases of the excitation light beams Lx, Ly change, the change of the idler light beam La changes with the change. Thus, the phase change in the graph Ge is different from the phase change in the graph Gc, and the difference is detected as an error of signal data.

As described above, when the excitation light beams Lx, Ly are subjected to phase modulation, the phase of the idler light beam La is affected by the phase modulation components, causing an error of signal data.

Thus, the effect of phase modulation is offset between the excitation light beams Lx, Ly by phase-modulating the excitation light beams Lx, Ly so as to achieve opposite phases.

Figure 3:
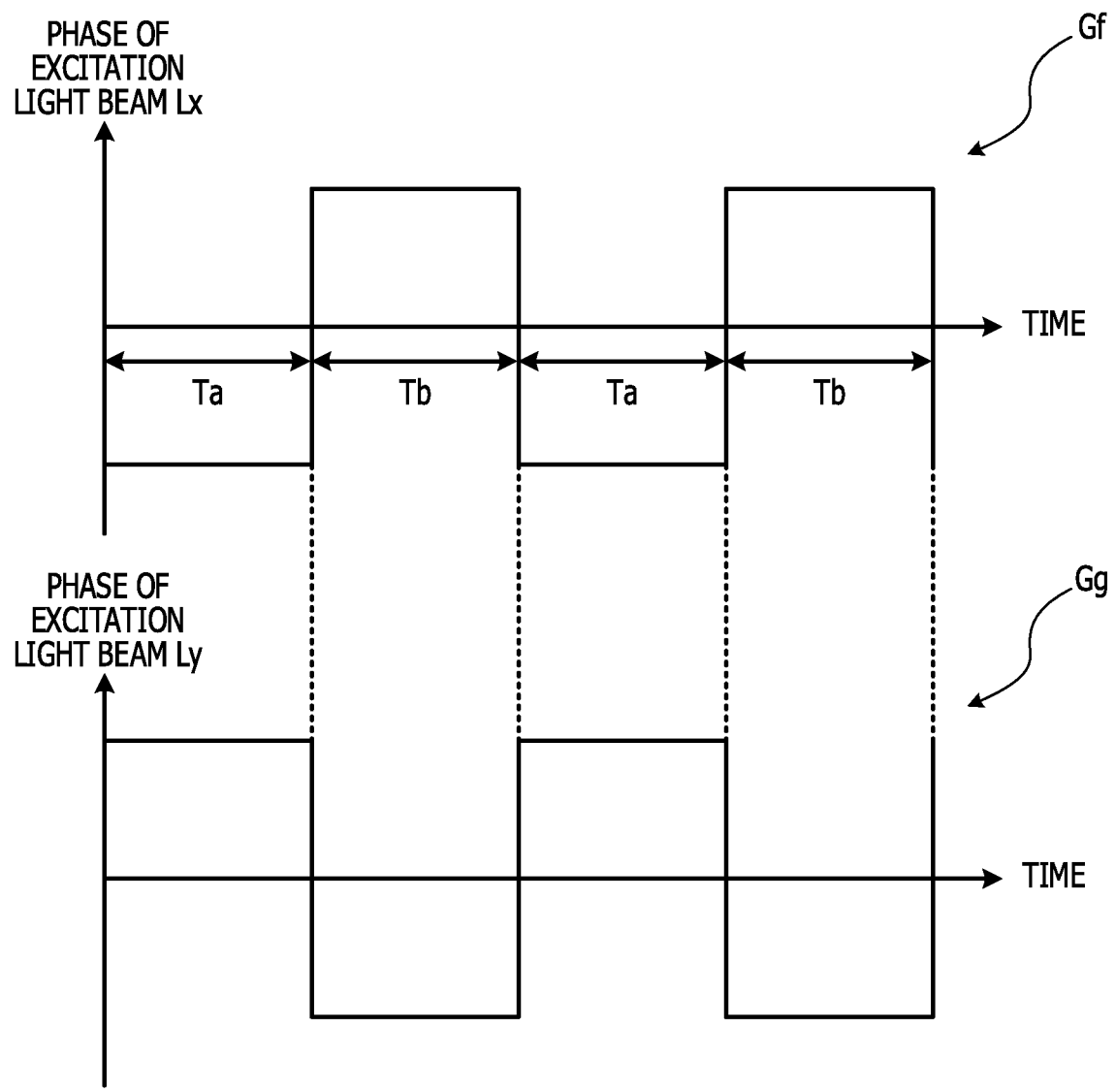
FIG. 3 is a view illustrating an example of a phase change is a view illustrating an example of a phase change in the excitation light beams subjected to phase modulation so as to achieve opposite phases.

FIG. 3 is a view illustrating an example of a phase change in the excitation light beams Lx, Ly subjected to phase modulation so as to achieve opposite phases. A graph Gf illustrates a phase change in the excitation light beam Lx, and a graph Gg illustrates a phase change in the excitation light beam Ly.

In periods Ta, Tb of phase modulation that alternately arrive, the excitation light beams Lx, Ly change in opposite phases. In the period Ta, the excitation light beam Lx has a negative phase, and the excitation light beam Ly has a positive phase. In the period Tb, the excitation light beam Lx has a positive phase, and the excitation light beam Ly has a negative phase.

For this reason, electric fields of the excitation light beams Lx, Ly oscillate in opposite directions. For this reason, in the above-mentioned formula (1), the phase modulation of light having the center frequency (fi+fj) does not affect the idler light beam La. This may suppress superimposition of phase modulation components of the excitation light beams Lx, Ly on the idler light beam La.

Next, generating one excitation light beam Lc combined from the excitation light beams Lx, Ly will be described.

FIG. 4 is a view illustrating an example of the excitation light beam Lc combined from the excitation light beams Lx, Ly. FIG. 4 illustrates the phases of the excitation light beams Lx, Ly, and Lc using the X axis and the Y axis as references. A sign Gh represents the phase in the period Ta in FIG. 3, and a sign Gi represents the phase in the period Tb in FIG. 3.

Since the excitation light beams Lx, Ly have opposite phases, the excitation light beams Lx, Ly may be combined into the excitation light beam Lc having a polarization angle of 45 degrees with respect to the Y axis and the X axis. The electric field of the excitation light beam Lc oscillates at 45 degrees in the positive direction along the Y axis and the negative direction along the X axis in the period Ta, and oscillates at 45 degrees in the negative direction along the Y axis and the positive direction along the X axis in the period Tb.

That is, the phase of the excitation light beam Lc cyclically changes in the positive and negative directions along a polarization axis N forming 45 degrees with respect to the X axis and the Y axis.

Figure 5:
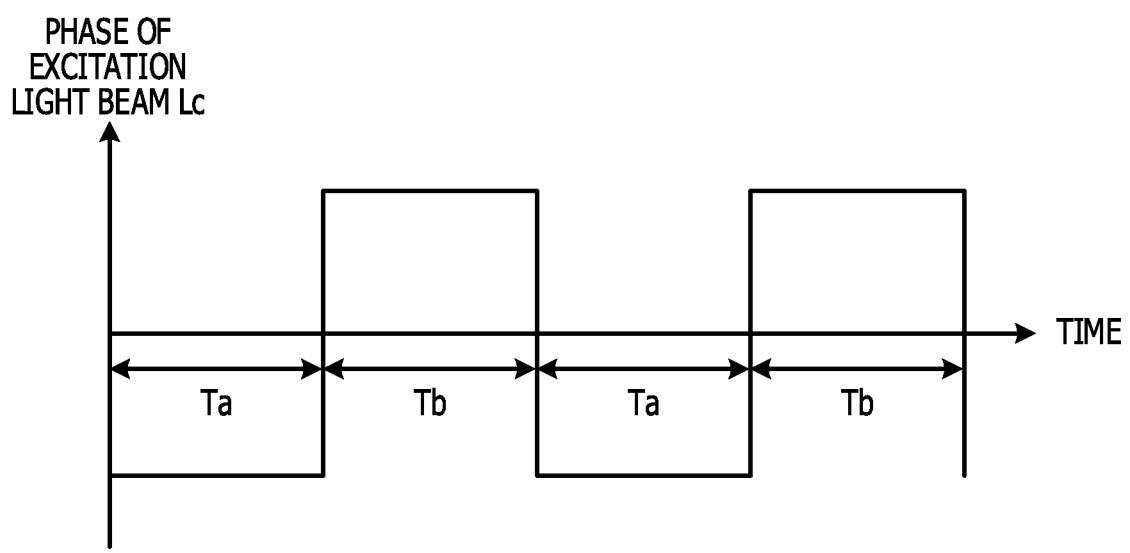
FIG. 5 is a view illustrating an example of a phase change in the excitation light beam combined from the excitation light beams.

FIG. 5 is a view illustrating an example of a phase change in the excitation light beam Lc combined from the excitation light beams Lx, Ly. The phase of the excitation light beam Lc has the negative phase in the period Ta and the positive phase in the period Tb along the polarization axis N.

As described above, since the excitation light beams Lx, Ly are equivalent to the excitation light beam Lc in the polarization direction forming 45 degrees with respect to the X axis and the Y axis, the idler light beam La may be generated by four-wave mixing of the excitation light beam Lc and the signal light beam Ls.

Figure 6:
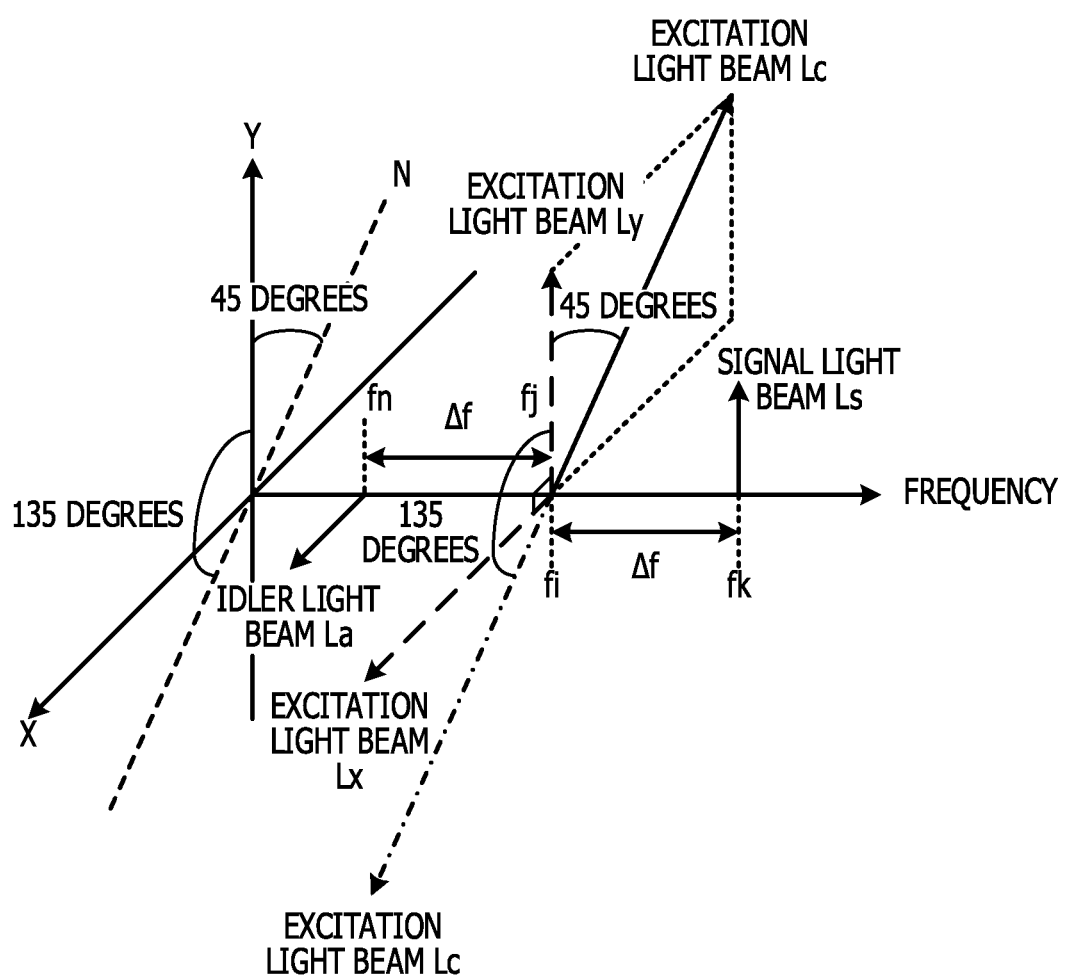
FIG. 6 is a view illustrating an example of the state where an idler light beam is generated from a signal light beam and one excitation light beam.

FIG. 6 is a view illustrating an example of the state where the idler light beam La is generated from the signal light beam Ls and one excitation light beam Lc. The same components in FIG. 6 as those in FIG. 1 are given the same reference numerals and description thereof is omitted.

The polarization angle of the excitation light beam Lc is 45 degrees with respect to the polarization angle of the signal light beam Ls in the positive direction along the Y axis. When positive and negative of the phase of the excitation light beam Lc is inverted, as expressed by a dot-and-dash line, the polarization angle of the excitation light beam Lc may be 135 degrees with respect to the polarization angle of the signal light beam Ls.

Since the excitation light beam Lc is combined from two excitation light beams Lx, Ly as described above, the idler light beam La is generated by four-wave mixing of the excitation light beam Lc and the signal light beam Ls.

According to the method illustrated in FIGS. 1 and 6, the excitation light beams Lx, Ly, and Lc of single wavelength fi, fj are used. Thus, in the case of nondegenerative four-wave mixing, phase matching conditions of degenerative four-wave mixing may be applied as phase matching conditions, and only the condition that zero dispersion wavelength is the center of each wavelength band before and after conversion has to be satisfied, relaxing phase matching conditions as compared with degenerative four-wave mixing.

Therefore, highly-efficient wavelength conversion may be readily performed merely by setting the wavelength fi, fj of the excitation light beams Lx, Ly, and Lc to the zero dispersion wavelength. Especially, when only one excitation light beam Lc is used as illustrated in FIG. 6, only one excitation light beam Lc is required, enabling wavelength conversion more readily than the case of using two excitation light beams Lx, Ly as illustrated in FIG. 1.

In the above-mentioned example, the polarization direction of the signal light beam Ls is the positive direction along the Y axis and however, is not limited to this direction.

Figure 7:
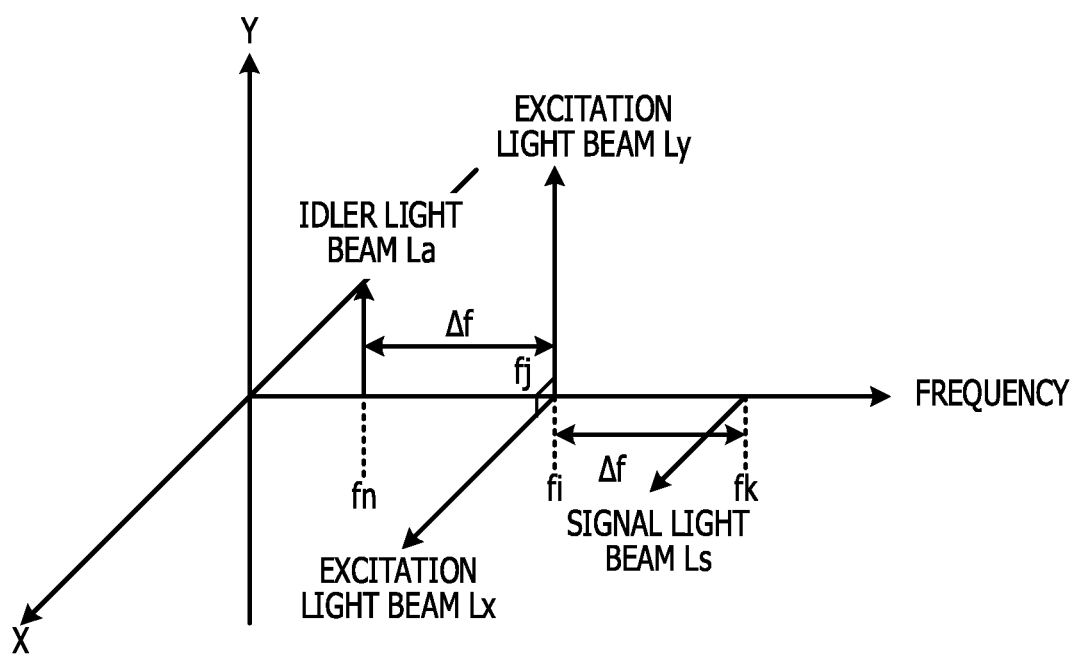
FIG. 7 is a view illustrating another example of the state where an idler light beam is generated from a signal light beam and two excitation light beams.

FIG. 7 is a view illustrating another example of the state where the idler light beam La is generated from the signal light beam Ls and the two excitation light beams Lx, Ly. The same components in FIG. 7 as those in FIG. 1 are given the same reference numerals and description thereof is omitted.

Unlike the example illustrated in FIG. 1, the signal light beam Ls has only the X-axis polarization component. The signal light beam Ls and the excitation light beams Lx, Ly are inputted to the nonlinear optical medium such as the dispersion-shifted optical fiber to generate four-wave mixing. Due to the frequency difference, beat light occurs between the signal light beam Ls and the excitation light beam Lx that have the same polarization direction. The excitation light beam Ly generates the idler light beam La having the same polarization component due to the effect of the beat light.

Also in the case illustrated in FIG. 7, single excitation light beam Lc may be used.

Figure 8:
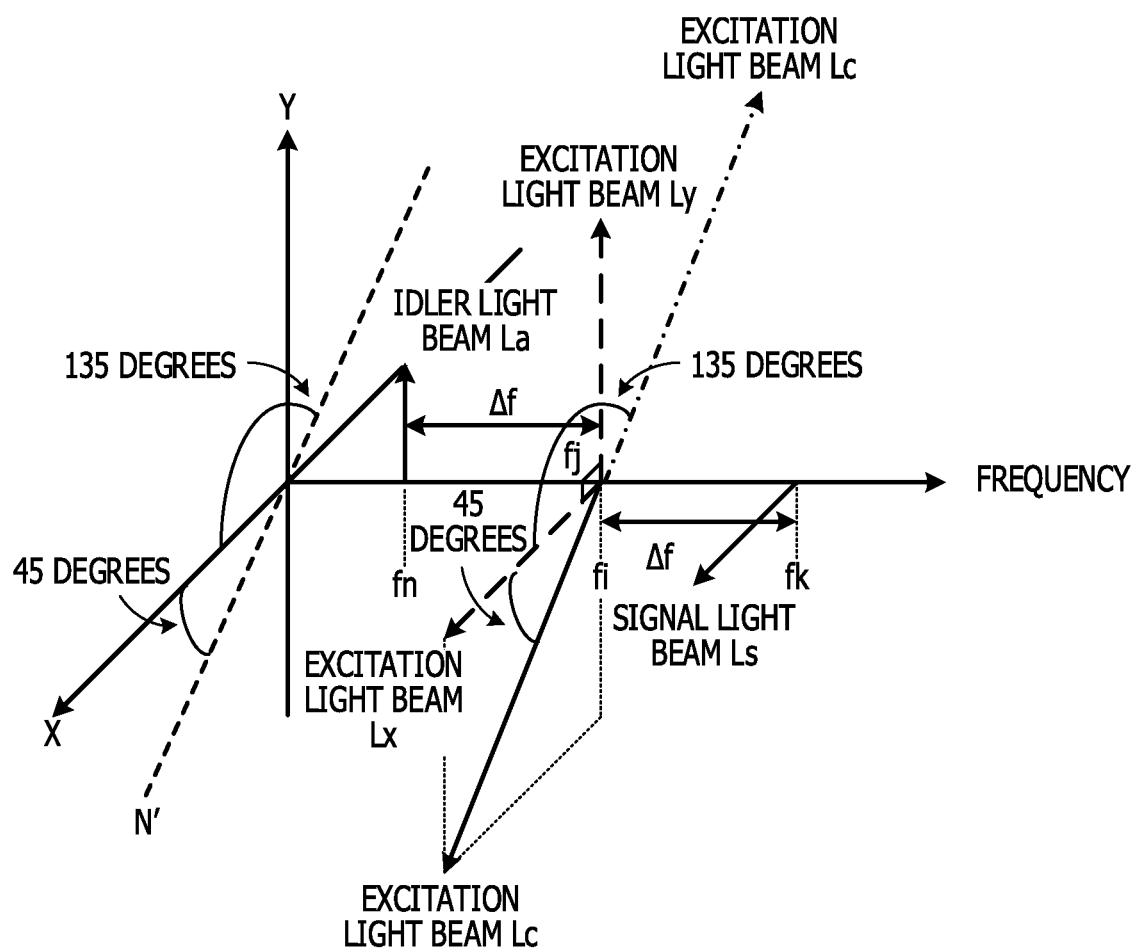
FIG. 8 is a view illustrating another example of the state where an idler light beam is generated from a signal light beam and one excitation light beam.

FIG. 8 is a view illustrating another example of the state where the idler light beam La is generated from the signal light beam Ls and one excitation light beam Lc. The same components in FIG. 8 as those in FIG. 7 are given the same reference numerals and description thereof is omitted.

The polarization angle of the excitation light beam Lc is 45 degrees with respect to the polarization angle of the signal light beam Ls in the positive direction along the X axis. When positive and negative of the phase of the excitation light beam Lc is inverted, as expressed by a dot-and-dash line, the polarization angle of the excitation light beam Lc may be 135 degrees with respect to the polarization angle of the signal light beam Ls.

Since the excitation light beam Lc is combined from two excitation light beams Lx, Ly as described above, the idler light beam La is generated by four-wave mixing of the excitation light beam Lc and the signal light beam Ls.

Next, a configuration example of a wavelength conversion device using the method illustrated in FIG. 6 will be described.

Figure 9:
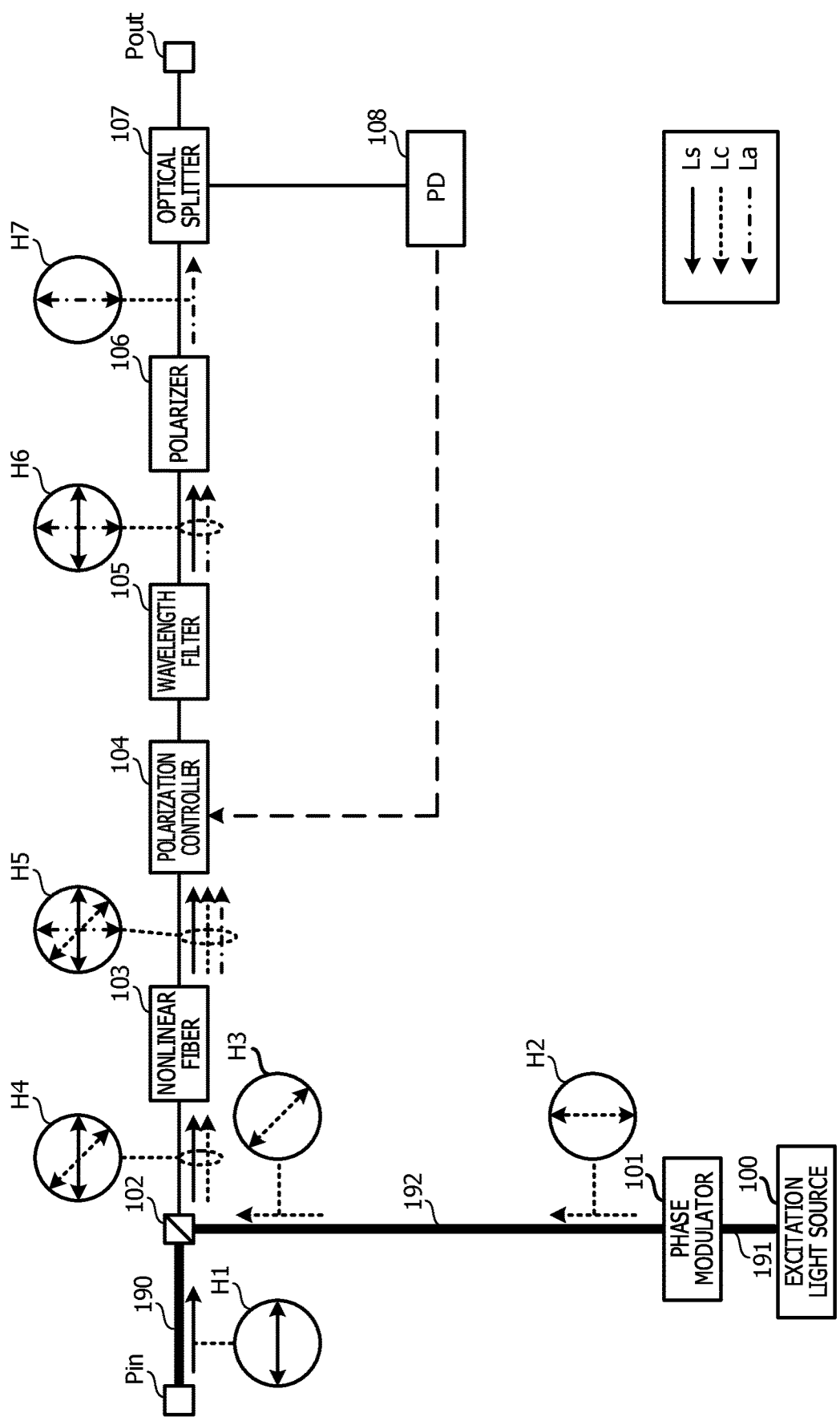
FIG. 9 is a configuration view illustrating an example of a wavelength conversion device.

FIG. 9 is a configuration view illustrating an example of a wavelength conversion device. The wavelength conversion device has an input port Pin, an output port Pout, an excitation light source 100, a phase modulator 101, a wavelength divisional multiplex (WDM) coupler 102, a nonlinear fiber 103, polarization controller 104, a wavelength filter 105, a polarizer 106, an optical splitter 107, and a photo detector (PD) 108.

The input port Pin is connected to the WDM coupler 102, excitation light source 100 is connected to the phase modulator 101, and the phase modulator 101 is connected to the WDM coupler 102 via the polarization-maintaining fibers 190 to 192, respectively. The nonlinear fiber 103 is an example of the nonlinear optical medium, and does not have a polarization-maintaining function.

As expressed in a rectangular box, an arrow represented by solid line indicates the propagation line of the signal light beam Ls, an arrow represented by dotted line indicates the propagation line of the excitation light beam Lc, and an arrow represented by dot-and-dash line indicates the propagation line of the idler light beam La. Signs H1 to H7 indicates the polarization directions of the signal light beam Ls, the excitation light beam Lc, and the idler light beam La. The polarization direction is illustrated using the sheet horizontal direction as the X axis and the sheet vertical direction as the Y axis.

The wavelength conversion device in this embodiment performs wavelength conversion by generating the idler light beam La having only the Y-axis polarization component from the signal light beam Ls that having only the X-axis polarization component (that is, not polarization-combined). As represented by the sign H1, the signal light beam Ls is inputted from the input port Pin, and inputted to the WDM coupler 102.

The excitation light source 100 is, for example, a laser diode, and outputs the continuously-oscillating excitation light beam Lc to the phase modulator 101. As an example, the excitation light beam Lc has the Y-axis polarization component. The excitation light beam Lc is inputted to the phase modulator 101 while maintaining the polarization angle by the polarization-maintaining fiber 191. The phase modulator 101 phase-modulates the excitation light beam Lc based on an electric signal. The excitation light beam Lc is inputted to the WDM coupler 102 via the polarization-maintaining fiber 192. The excitation light source 100 is an example of a light source, and the phase modulator 101 is an example of a modulation part.

The polarization-maintaining fiber 192 adjusts the polarization angle of the excitation light beam Lc to 45 degrees or 135 degrees with respect to the signal light beam Ls. For example, the polarization-maintaining fiber 192 is provided such that a difference in connection angle between a connection end on the side of the phase modulator 101 and a connection end on the side of the WDM coupler 102 becomes 45 degrees or 135 degrees.

Thereby, as represented by the signs H2, H3, the excitation light beam Lc propagates in the Y axis at outputting from the phase modulator 101, but is inclined at 45 degrees with respect to the Y axis at inputting to the WDM coupler 102. The polarization-maintaining fiber 192 is an example of an adjustment part, and a means for adjusting the polarization angle of the excitation light beam Lc is not limited to the polarization-maintaining fiber 192, and may be a polarization controller or the like.

As represented by the sign H4, the WDM coupler 102 wavelength-multiplexes the signal light beam Ls and the excitation light beam Lc, and guides the multiplexed beam to the nonlinear fiber 103.

The nonlinear fiber 103 generates four-wave mixing of the excitation light beam Lc whose the polarization angle is adjusted and the signal light beam Ls, thereby generating the idler light beam La having the center frequency corresponding to a Δf between center frequencies of the signal light beam Ls and the excitation light beam Lc from the signal light beam Ls as represented by the sign H5. Thereby, the wavelength of the signal light beam Ls is converted into the wavelength of the idler light beam La. Examples of the nonlinear fiber 103 include, but not limited to, a nonlinear optical medium and a dispersion-shifted optical fiber. The signal light beam Ls, the excitation light beam Lc, and the idler light beam La are inputted to the polarization controller 104.

As represented by a dotted line, the polarization controller 104 controls the polarization angles of the signal light beam Ls, the excitation light beam Lc, and the idler light beam La according to feedback control from the PD 108. The signal light beam Ls, the excitation light beam Lc, and the idler light beam La are inputted to the wavelength filter 105.

The wavelength filter 105 removes the excitation light beam Lc among the signal light beam Ls, the excitation light beam Lc, and the idler light beam La from the polarization controller 104. For example, the wavelength filter 105 has filtering characteristics of blocking light having the wavelength of the excitation light beam Lc.

As described above, since the wavelength filter 105 removes the excitation light beam Lc, the wavelength filter 105 is not required outside of the wavelength conversion device. The wavelength filter 105 is an example of a first removal part. As represented by the sign H6, the signal light beam Ls and the idler light beam La are inputted to the polarizer 106.

The polarizer 106 removes the signal light beam Ls among the signal light beam Ls and the idler light beam La from the wavelength filter 105. The polarizer 106 has polarizing characteristics of blocking polarized light along the X axis. The polarizer 106 may remove crosstalk light (XT light) caused in the nonlinear fiber 103 by four-wave mixing.

As described above, since the polarizer 106 removes the signal light beam Ls, the polarizer 106 is not required outside of the wavelength conversion device. The polarizer 106 is an example of a second removal part. The idler light beam La outputted from the polarizer 106 is inputted to the optical splitter 107.

The optical splitter 107 branches the idler light beam La into the output port Pout and the PD 108. The output port Pout outputs the idler light beam La as the wavelength-converted signal light beam Ls.

The PD 108 detects power of the idler light beam La, and controls the polarization controller 104 according to the detection value. The polarization angle of the idler light beam La is controlled to a suitable value based on the power.

Figure 10:
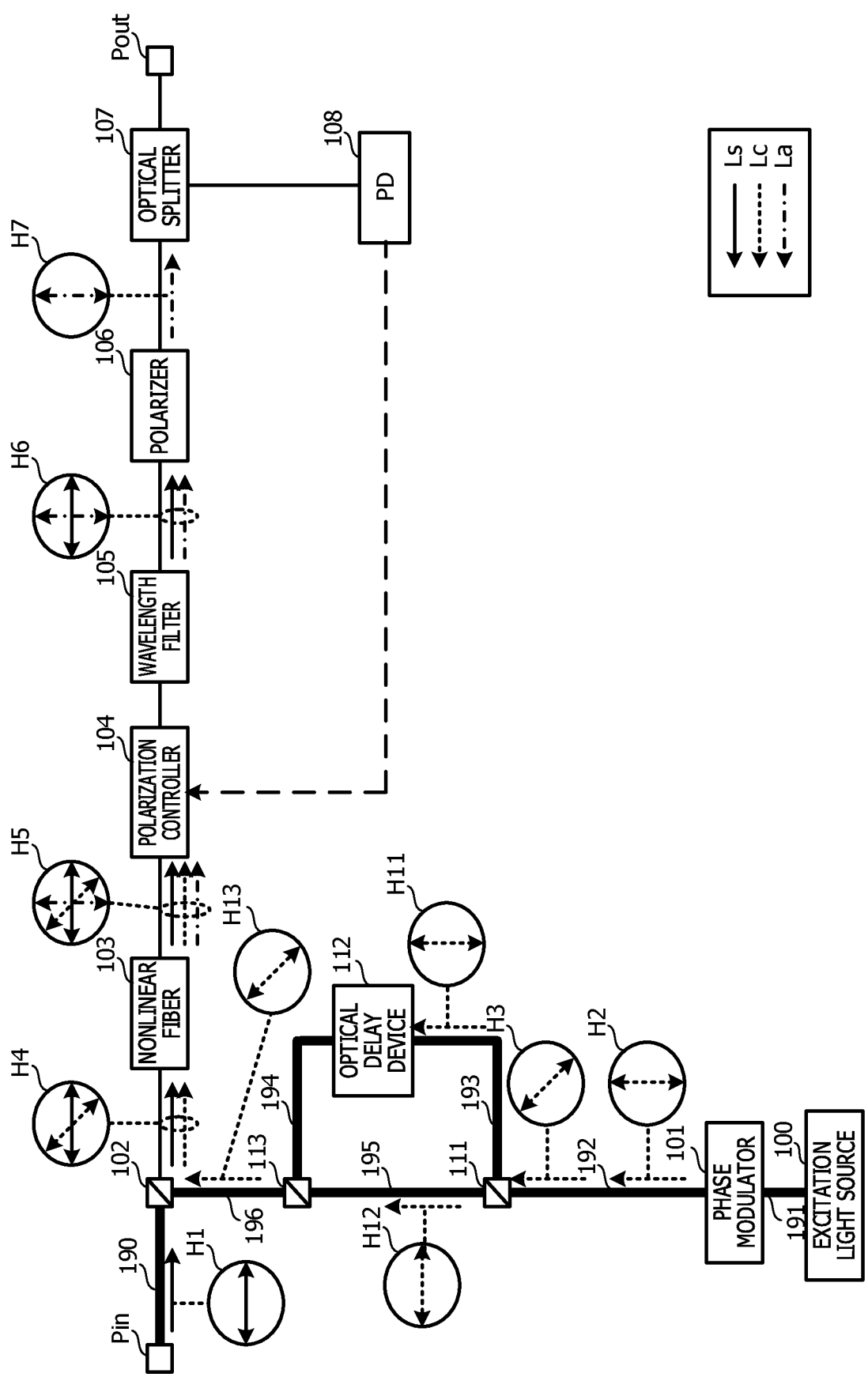
FIG. 10 is a configuration view illustrating another example of the wavelength conversion device.

FIG. 10 is a configuration view illustrating another example of the wavelength conversion device. The same components in FIG. 10 as those in FIG. 9 are given the same reference numerals and description thereof is omitted.

Unlike the example illustrated in FIG. 9, the wavelength conversion device includes, between the WDM coupler 102 and the polarization-maintaining fiber 192, a polarizing beam splitter (PBS) 111, a polarizing beam combiner (PBC) 113, an optical delay device 112, and polarization-maintaining fiber 193 to 195.

The PBS 111 is connected to the polarization-maintaining fibers 192, 193, and 195. The excitation light beam Lc is inputted from the polarization-maintaining fiber 192 to the PBS 111, thereby being divided into two polarization components that are orthogonal to each other. The polarization components are guided from the PBS 111 to the respective polarization-maintaining fibers 193, 195. The PBS 111 is an example of a division part.

As represented by the sign H12, the X-axis polarization component is inputted from the polarization-maintaining fiber 195 to the PBC 113. As represented by the sign H11, the Y-axis polarization component is inputted from the polarization-maintaining fiber 193 to the optical delay device 112. Here, the X-axis polarization component corresponds to the excitation light beam Lx, and the Y-axis polarization component corresponds to the excitation light beam Ly.

The optical delay device 112 is, for example, a long polarization-maintaining fiber, and delays the Y-axis polarization component. The Y-axis polarization component is outputted from the optical delay device 112 to the polarization-maintaining fiber 194 and then, is inputted to the PBC 113.

The PBC 113 combines the X-axis polarization component with the Y-axis polarization component into one excitation light beam Lc. As represented by the sign H13, the combined excitation light beam Lc is inputted from the polarization-maintaining fiber 196 to the WDM coupler 102. Then, as in the above-mentioned example, the nonlinear fiber 103 generates four-wave mixing from the excitation light beam Lc and the signal light beam Ls.

The optical delay device 112 delays the Y-axis polarization component with respect to the X-axis polarization component such that two polarization components of the excitation light beam Lc have opposite phases. Thereby, the excitation light beams Lx, Ly having the opposite phases as illustrated in FIG. 3 may be generated at high accuracy, suitably suppressing superimposition of phase-modulated components onto the idler light beam La. For example, in the case of the signal light beam Ls of 100 (Gbps), the accuracy less than 0.3 (mm) between the phases of the polarization components is required in terms of length of optical fiber. The optical delay device 112 is an example of a delay insertion part.

The signal light beam Ls in this embodiment has polarization multiplexed light as well as only unidirectional polarization component. However, the signal light beam Ls of polarization multiplexed light may be wavelength-converted according to the above-mentioned method.

Figure 11:
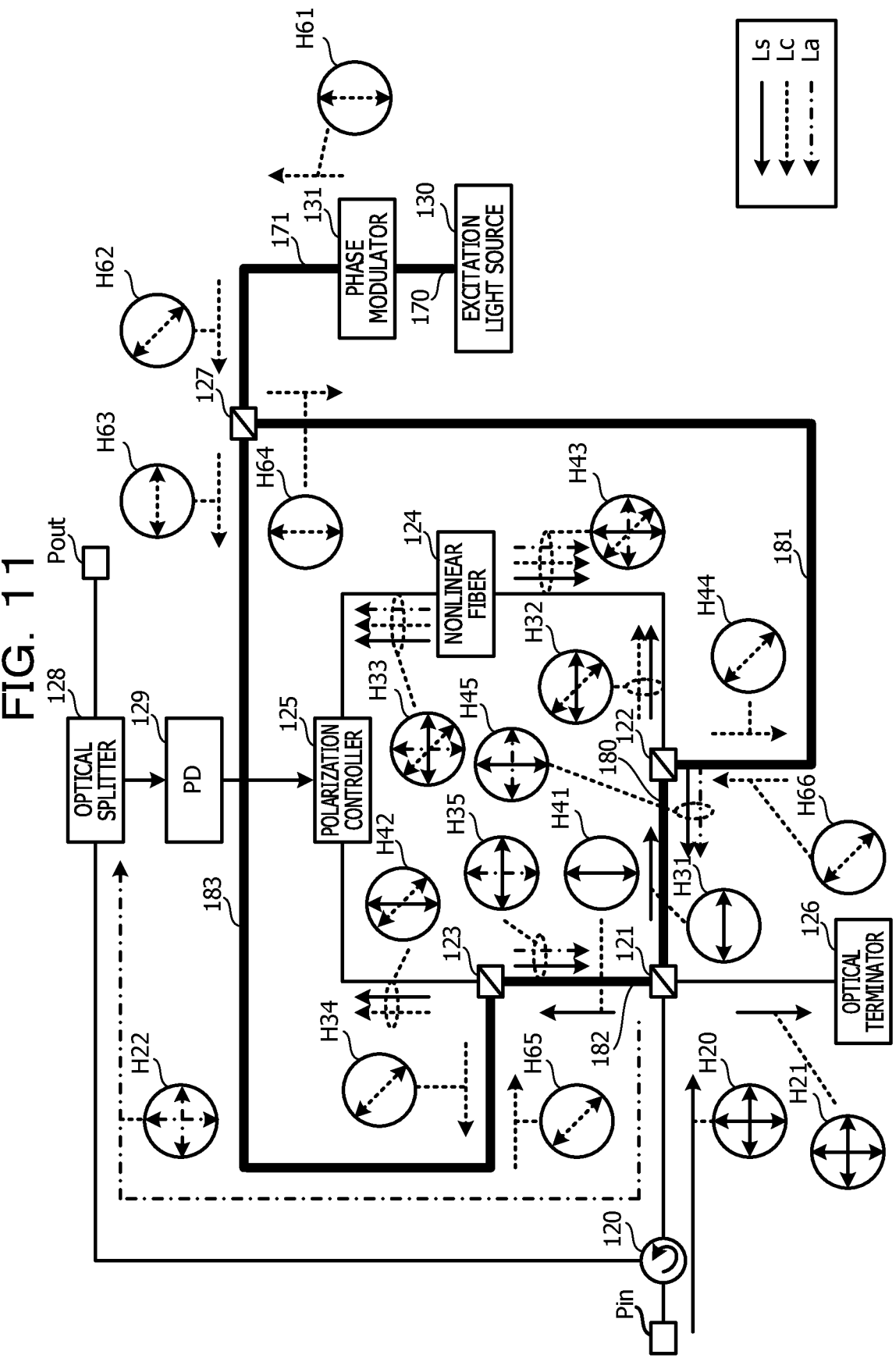
FIG. 11 is a configuration view illustrating an example of the wavelength conversion device that wavelength-converts a signal light beam of polarization multiplexed light.

FIG. 11 is a configuration view illustrating an example of a wavelength conversion device that wavelength-converts the signal light beam Ls of polarization multiplexed light. As represented in a rectangular box, an arrow represented by solid line indicates the polarization direction of the signal light beam Ls, an arrow represented by dotted line indicates the polarization direction of the excitation light beam Lc, and an arrow represented by dot-and-dash line indicates the polarization direction of the idler light beam La. Signs H20 to H22, H31 to H35, H41 to H45, and H61 to H65 indicate the polarization directions of the signal light beam Ls, the excitation light beam Lc, and the idler light beam La. The polarization direction is illustrated using the sheet horizontal direction as the X axis and the sheet vertical direction as the Y axis.

The wavelength conversion device has an input port Pin, an output port Pout, an optical circulator 120, PBSs 121, 127, WDM couplers 122, 123, a nonlinear fiber 124, a polarization controller 125, an optical terminator 126, an optical splitter 128, a PD 129, an excitation light source 130, a phase modulator 131, and polarization-maintaining fibers 180 to 183, 170, and 171.

The signal light beam Ls is inputted from the input port Pin, passes through the optical circulator 120, and is inputted to the PBS 121. As represented by the sign H20, the signal light beam Ls includes X-axis and Y-axis polarization components.

The PBS 121 is an example of a second division part, and divides the signal light beam Ls into two polarization components that are orthogonal to each other. The X-axis polarization component is inputted from the PBS 121 to the WDM coupler 122 through the polarization-maintaining fiber 180. The Y-axis polarization component is inputted from the PBS 121 to the WDM coupler 123 through the polarization-maintaining fiber 182. The Y-axis polarization component is an example of a third polarization component, and X-axis polarization component is an example of a fourth polarization component.

The excitation light source 130 is an example of a light source, and outputs the excitation light beam Lc. The excitation light beam Lc is inputted from the excitation light source 130 to the phase modulator 131 through the polarization-maintaining fiber 170. Examples of the excitation light source 130 include, but not limited to, a laser diode.

The phase modulator 131 is an example of a modulation part, and phase-modulates the excitation light beam Lc. The phase-modulated excitation light beam Lc is inputted to the PBS 127 through the polarization-maintaining fiber 171. As represented by the signs H61, H62, the polarization-maintaining fiber 171 inclines the polarization direction of the excitation light beam Lc by 45 degrees with respect to the Y axis. Thus, like the polarization-maintaining fiber 192, the polarization-maintaining fiber 171 is provided such that a difference in connection angle between a connection end on the side of the phase modulator 131 and a connection end on the side of the PBS 127 becomes 45 degrees or 135 degrees.

The PBS 127 is an example of a first division part, and divides the excitation light beam Lc into two polarization components that are orthogonal to each other. As represented by the sign H64, the Y-axis polarization component is inputted from the PBS 127 to the polarization-maintaining fiber 181, and as represented by the sign H63, X-axis polarization component is inputted from the PBS 127 to the polarization-maintaining fiber 183. The X-axis polarization component is inputted from the polarization-maintaining fiber 183 to the WDM coupler 123, and the Y-axis polarization component is inputted from the polarization-maintaining fiber 181 to the WDM coupler 122. The X-axis polarization component is an example of a first polarization component, and the Y-axis polarization component is an example of a second polarization component.

The polarization-maintaining fiber 183 is an example of a first polarization adjustment part, and adjusts the polarization angle of the X-axis polarization component of the excitation light beam Lc to 45 degrees or 135 degrees with respect to the polarization angle of the Y-axis polarization component of the signal light beam Ls (see the sign H65). For this reason, like the polarization-maintaining fiber 192, the polarization-maintaining fiber 183 is provided such that a difference in connection angle between a connection end on the side of the WDM coupler 123 and a connection end on the side of the PBS 127 becomes 45 degrees or 135 degrees.

The polarization-maintaining fiber 181 is an example of a second polarization adjustment part, and adjusts the polarization angle of the Y-axis polarization component of the excitation light beam Lc to 45 degrees or 135 degrees with respect to the polarization angle of the X-axis polarization component of the signal light beam Ls (see the sign H66). For this reason, like the polarization-maintaining fiber 192, the polarization-maintaining fiber 181 is provided such that a difference in connection angle between a connection end on the side of the WDM coupler 122 and a connection end on the side of the PBS 127 becomes 45 degrees or 135 degrees.

The WDM coupler 123 wavelength-multiplexes one polarization component of the excitation light beam Lc whose polarization angle is adjusted, and the Y-axis polarization component of the signal light beam Ls. As represented by the sign H42, the wavelength-multiplexed light beam is inputted to the nonlinear fiber 124 through the polarization controller 125. The nonlinear fiber 124 is an example of a nonlinear optical medium.

The nonlinear fiber 124 generates four-wave mixing of one polarization component of the excitation light beam Lc whose polarization angle is adjusted, and the Y-axis polarization component of the signal light beam Ls, thereby generating the idler light beam La having a frequency corresponding to a difference between the frequencies of the signal light beam Ls and the excitation light beam Lc from the polarization component of the excitation light beam Lc. The idler light beam La is an example of a first idler light beam, and has the X-axis polarization component.

As represented by the sign H43, the polarization component of the excitation light beam Lc, the Y-axis polarization component of the signal light beam Ls, and the idler light beam La are inputted from the nonlinear fiber 124 to the WDM coupler 122. The WDM coupler 122 has a wavelength-dividing function, and as represented by the sign H44, divides the polarization component of the excitation light beam Lc and guides the divided polarization components to the polarization-maintaining fiber 181. As represented by the sign H45, the remaining Y-axis polarization component of the signal light beam Ls and the idler light beam La are inputted from the polarization-maintaining fiber 180 to the PBS 121.

The WDM coupler 122 wavelength-multiplexes the other polarization component of the excitation light beam Lc whose polarization angle is adjusted, and the X-axis polarization component of the signal light beam Ls. As represented by the sign H32, the wavelength-multiplexed light beam is inputted to the nonlinear fiber 124.

The nonlinear fiber 124 generates four-wave mixing of the other polarization component of the excitation light beam Lc whose polarization angle is adjusted, and the X-axis polarization component of the signal light beam Ls, thereby generating the idler light beam La having a frequency corresponding to a difference between the frequencies of the signal light beam Ls and the excitation light beam Lc from the polarization component of the excitation light beam Lc. The idler light beam La is an example of a second idler light beam, and has the Y-axis polarization component.

As represented by the sign H33, the polarization component of the excitation light beam Lc, the X-axis polarization component of the signal light beam Ls, and the idler light beam La are inputted from the nonlinear fiber 124 to the WDM coupler 123 through the polarization controller 125. The WDM coupler 123 has a wavelength-dividing function, and as represented by the sign H34, divides the polarization component of the excitation light beam Lc and guides the divided polarization components to the polarization-maintaining fiber 183. As represented by the sign H35, the remaining X-axis polarization component of the signal light beam Ls and the idler light beam La are inputted from the polarization-maintaining fiber 182 to the PBS 121.

The X-axis and Y-axis polarization components of the signal light beam Ls, and X axis and Y-axis polarization angles of each idler light beam La (hereinafter referred to as merely idler light beam La) are inputted to the PBS 121. The X-axis and Y-axis polarization components are guided from the PBS 121 to the optical terminator 126. The optical terminator 126 terminates each polarization component. As represented by the sign H22, the idler light beam La is inputted from the PBS 121 to the optical circulator 120, and guided to the optical splitter 128.

The optical splitter 128 blanches the idler light beam La into the output port Pout and the PD 129. The PD 129 detects power of the idler light beam La, and feedbacks the power to the polarization controller 125. Based on the power, the polarization controller 125 controls the polarization angles of the signal light beam Ls and the excitation light beam Lc.

As described above, the wavelength conversion device in this embodiment generates the idler light beam La from each of the X-axis and Y-axis polarization components of the signal light beam Ls according to the method in FIG. 6. Accordingly, highly-efficient wavelength conversion may be readily performed.

The wavelength conversion device in this embodiment uses the single excitation light source 130 and however, may use two excitation light sources.

Figure 12:
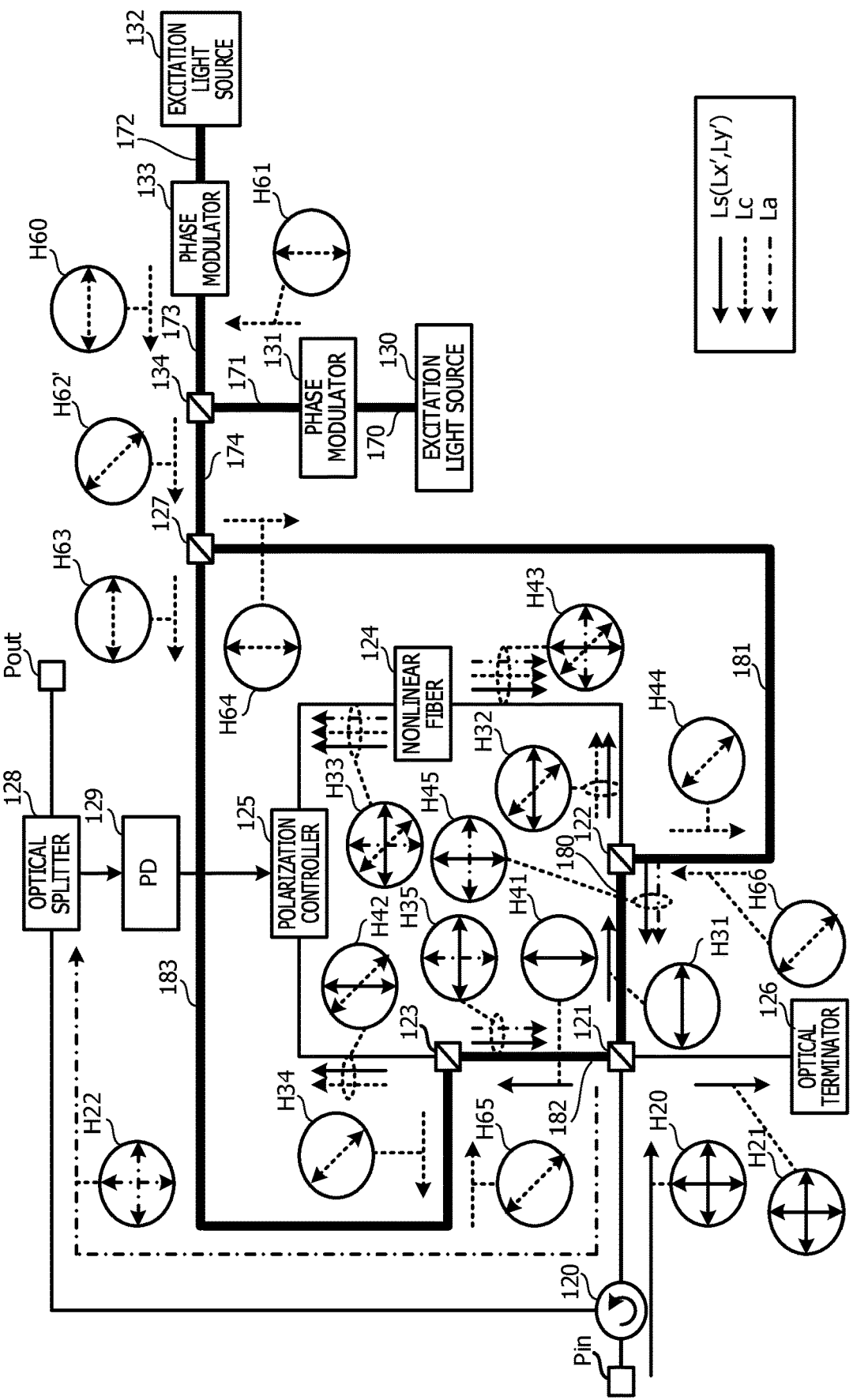
FIG. 12 is a configuration view illustrating another example of the wavelength conversion device that wavelength-converts a signal light beam of polarization multiplexed light.

FIG. 12 is a configuration view illustrating another example of the wavelength conversion device that wavelength-converts the signal light beam Ls of polarization multiplexed light. The same components in FIG. 12 as those in FIG. 11 are given the same reference numerals and description thereof is omitted. The wavelength conversion device has an excitation light source 132, a phase modulator 133, and a PBC 134 in addition to the excitation light source 130 and the phase modulator 131.

The excitation light sources 130, 132 each output the excitation light beams Lx', Ly' (Ls) that have the same frequency and orthogonal polarization angles, respectively. As represented by the sign H60, the excitation light source 132 outputs the excitation light beam Lx' having the X-axis polarization angle. As represented by the sign H61, the other excitation light source 130 outputs the excitation light beam Ly' having the Y-axis polarization angle.

The excitation light beams Lx', Ly' are inputted from the excitation light sources 132, 130 to the phase modulators 133, 131 through the polarization-maintaining fibers 172, 170, respectively. The excitation light sources 130, 132 are examples of a first light source and a second light source, respectively, and the excitation light beams Lx', Ly' are examples of a first excitation light beam and a second excitation light beam, respectively.

As described with reference to FIG. 3, the phase modulators 131, 133 phase-modulate the excitation light beams Lx', Ly' such that the excitation light beams Lx', Ly' have opposite phases, respectively. The excitation light beams Lx', Ly' are inputted from the phase modulators 131, 133 to the PBC 134 through the polarization-maintaining fibers 171, 173, respectively. Here, the polarization-maintaining fibers 171, 173 have the same length.

The PBC 134 is an example of a generation part, and combines the excitation light beams Lx', Ly' into one excitation light beam Lc. Since the polarization-maintaining fibers 173, 171 have the same length, there is no difference between the phases of the excitation light beams Lx', Ly' inputted to the PBC 134. The excitation light beam Lc is an example of a third excitation light beam.

As represented by the sign H62', the excitation light beam Lc has a polarization angle inclined by 45 degrees with respect to the Y axis, and is inputted from the polarization-maintaining fiber 174 to the PBS 127. Then, wavelength conversion is performed by the above-mentioned processing.

Next, a transmission system using the wavelength conversion device will be described.

Figure 13:
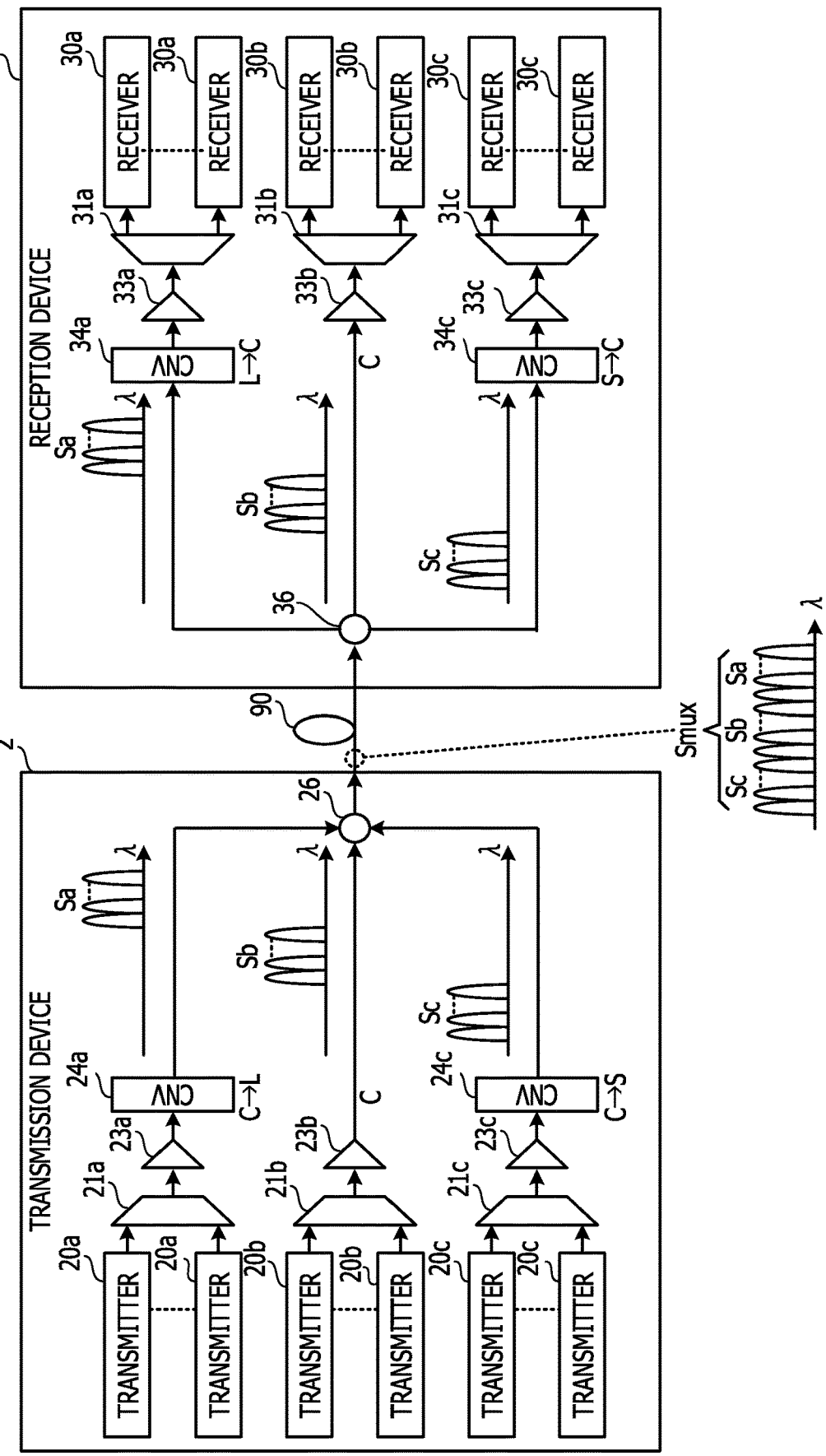
FIG. 13 is a configuration view illustrating an example of a transmission system.

FIG. 13 is a configuration view illustrating an example of the transmission system. The transmission system has a transmission device 2 and a reception device 3 that are interconnected via a transmission line 90 such as an optical fiber. The transmission device 2 transmits a wavelength-multiplexed light beam Smux, and the reception device 3 receives the wavelength-multiplexed light beam Smux. The transmission device 2 is an example of a transmission device.

The transmission device 2 uses wavelength conversion devices 24a, 24c to generate a wavelength-multiplexed light beam in an L band from wavelength-multiplexed light beam in an S band from a wavelength-multiplexed light beam in a C band. The transmission device 2 further combines wavelength-multiplexed light beams Sa to Sc in the L band, the C band, and the S band to generate one wavelength-multiplexed light beam Smux, and transmits the wavelength-multiplexed light beam Smux to the reception device 3. λ indicates wavelength.

The reception device 3 divides the wavelength-multiplexed light beams Sa to Sc in the L band, the C band, and the S band from the wavelength-multiplexed light beam Smux, and uses wavelength conversion devices 34a, 34c to generate the original wavelength-multiplexed light beam in the C band from the wavelength-multiplexed light beams Sa, Sc in the L band and the S band.

Thus, the transmission system may use the C band as well as the S band and the L band for transmission in despite of using inexpensive C-band optical equipment, achieving large-capacity transmission at low cost. The configuration of the transmission system will be described below.

The transmission device 2 has a plurality of transmitters 20a to 20c, a plurality of wavelength multiplexing parts 21a to 21c, a plurality of amplifiers 23a to 23c, wavelength conversion devices (CNV) 24a, 24c, and a combiner 26. The transmitters 20a to 20c each are, for example, a transponder, and transmits an optical signal having a wavelength in the C band.

The wavelength multiplexing part 21a wavelength-multiplexes optical signals having different wavelength inputted from the plurality of transmitters 20a, generating the wavelength-multiplexed light beam Sa in the C band. The wavelength multiplexing part 21b wavelength-multiplexes optical signals having different wavelength inputted from the plurality of transmitters 20b, generating the wavelength-multiplexed light beam Sb in the C band. The wavelength multiplexing part 2c wavelength-multiplexes optical signals having different wavelength inputted from the plurality of transmitters 20c, generating the wavelength-multiplexed light beam Sc in the C band.

Examples of the wavelength multiplexing parts 21a to 21c include, but not limited to an optical coupler. The wavelength multiplexing parts 21a to 21c each correspond to the C band. The wavelength multiplexing parts 21a, 21c are an example of a first generation part, and the wavelength multiplexing part 21b are an example of a second generation part. The wavelength-multiplexed light beams Sa, Sc is an example of a first wavelength-multiplexed light beam, and the wavelength-multiplexed light beam Sb is an example of a second wavelength-multiplexed light beam.

The wavelength-multiplexed light beams Sa to Sc are amplified by the amplifiers 23a to 23c, respectively. The amplifiers 23a to 23c each correspond to the C band. The amplified wavelength-multiplexed light beam Sb is inputted to the combiner 26. The amplified wavelength-multiplexed light beams Sa, Sc are inputted to the wavelength conversion devices 24a, 24c, respectively.

The wavelength conversion devices 24a, 24c have any of the configurations illustrated in FIGS. 9 to 12, and convert the wavelength band of the wavelength-multiplexed light beams Sa, Sc from the C band into the L band and the S band, respectively. Here, the wavelength-multiplexed light beams Sa, Sc before wavelength conversion correspond to the signal light beam Ls, and the wavelength-multiplexed light beams Sa, Sc after wavelength conversion correspond to the idler light beam La.

The wavelength-multiplexed light beam Sa in the L band and the wavelength-multiplexed light beam Sc in the S band are inputted to the combiner 26. Examples of the combiner 26 include, but not limited to, an optical coupler. The C band is an example of a first wavelength band, and the L band and the S band are examples of a second wavelength band. The wavelength conversion devices 24a, 24c are examples of a first wavelength conversion part.

The combiner 26 combines the wavelength-multiplexed light beams Sa to Sc in different wavelength bands into the wavelength-multiplexed light beam Smux. The wavelength-multiplexed light beam Smux is outputted from the combiner 26 to the transmission line 90, and inputted to the reception device 3. The combiner 26 is an example of a combination part.

The reception device 3 has a plurality of receivers 30a to 30c, a plurality of wavelength division parts 31a to 31c, a plurality of amplifiers 33a to 33c, wavelength conversion devices (CNV) 34a, 34c, and a separator 36. The separator 36 separates the wavelength-multiplexed light beam Smux inputted from the transmission line 90 into the wavelength-multiplexed light beams Sa to Sc. The separator 36 is an example of a separation part, and examples of the separator 36 include, but not limited to, a wavelength selection switch.

The divided wavelength-multiplexed light beam Sb is inputted to the amplifier 33b. The divided wavelength-multiplexed light beams Sa, Sc are inputted to the wavelength conversion devices 34a, 34c, respectively.

The wavelength conversion devices 34a, 34c have any of configurations illustrated in FIGS. 9 to 12, and convert the wavelength band of the wavelength-multiplexed light beams Sa, Sc from the L band and the S band into the C band, respectively. The wavelength-multiplexed light beams Sa, Sc before wavelength conversion correspond to the signal light beam Ls, and the wavelength-multiplexed light beams Sa, Sc after wavelength conversion correspond to the idler light beam La. The converted wavelength-multiplexed light beams Sa, Sc are inputted to the amplifiers 33a, 33c, respectively. The wavelength conversion devices 34a, 34c are examples of a second wavelength conversion part.

The amplifiers 33a to 33c amplify the wavelength-multiplexed light beams Sa to Sc, respectively. The amplifiers 33a to 33c each correspond to the C band. The amplified wavelength-multiplexed light beams Sa to Sc are inputted to the wavelength division parts 31a to 31c, respectively.

The wavelength division parts 31a to 31c divide the optical signal from the wavelength-multiplexed light beams Sa to Sc per wavelength. The wavelength division parts 31a to 31c each correspond to the C band. The wavelength division part 31a outputs the optical signal per wavelength to the receiver 30a, the wavelength division part 31b outputs the optical signal per wavelength to the receiver 30b, and the wavelength division part 31c outputs the optical signal per wavelength to the receiver 30c. The receivers 30a to 30c each are, for example, a transponder, and receive the optical signal. The wavelength division parts 31a, 31c are an example of a first wavelength division part, and the wavelength division part 31b is an example of a second wavelength division part.

As described above, the transmission system in this embodiment use the wavelength conversion devices 24a, 24c to convert the wavelength band of the wavelength-multiplexed light beams Sa, Sc between the C band, and the L band and the S band. For this reason, the transmission system may inexpensive C-band optical equipment, achieving large-capacity transmission corresponding to the wavelength band including the C band, the L band, and the S band.

The above-mentioned embodiments are exemplary preferred examples of the present disclosure. However, the present disclosure is not limited to the embodiments, and the embodiments may be variously modified so as not to deviate from the subject matter of the present disclosure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. A wavelength conversion device comprising:
a light source configured to output an excitation light beam;
a modulator configured to phase-modulate the excitation light beam;
a polarization adjustor configured to adjust a polarization angle of the excitation light beam to 45 degrees or 135 degrees with respect to a polarization angle of a signal light beam;
a nonlinear medium configured to generate four-wave mixing of the excitation light beam whose polarization angle is adjusted and the signal light beam to generate an idler light beam having a frequency corresponding to a difference between frequencies of the signal light beam and the excitation light beam from the signal light beam; and a second filter configured to remove the signal light beam from light outputted from the nonlinear optical medium.

2. The wavelength conversion device according to claim 1, further comprising:
a polarization divider configured to divide the excitation light beam whose polarization angle is adjusted into two polarization components that are orthogonal to each other;
a delay device configured to delay one of the two polarization components with respect to the other such that the two polarization components have opposite phases; and
a polarization combiner configured to combine the two polarization components having opposite phases, wherein
the nonlinear optical medium generates four-wave mixing of combined light inputted from the polarization combiner and the signal light beam.

3. The wavelength conversion device according to claim 1, further comprising a first filter configured to remove the excitation light beam from light outputted from the nonlinear optical medium.

4. A wavelength conversion device comprising:
a light source configured to output an excitation light beam;
a modulator configured to phase-modulate the excitation light beam;
a first polarization divider configured to divide the excitation light beam into a first polarization component and a second polarization component that are orthogonal to each other;
a second polarization divider configured to divide the signal light beam into a third polarization component and a fourth polarization component that are orthogonal to each other;
a first polarization adjustor configured to adjust a polarization angle of the first polarization component to 45 degrees or 135 degrees with respect to a polarization angle of the third polarization component;
a second polarization adjustor configured to adjust a polarization angle of the second polarization component to 45 degrees or 135 degrees with respect to a polarization angle of the fourth polarization component; and
a nonlinear medium configured to generate four-wave mixing of the first polarization component whose polarization angle is adjusted and the third polarization component, generating a first idler light beam having a frequency corresponding to a difference between frequencies of the signal light beam and the excitation light beam from the third polarization component, and to generate four-wave mixing of the second polarization component whose polarization angle is adjusted and the fourth polarization component, generating a second idler light beam having a frequency corresponding to a difference between frequencies of the signal light beam and the excitation light beam from the fourth polarization component.

5. A wavelength conversion device comprising:
a first light source configured to output a first excitation light beam;
a second light source configured to output a second excitation light beam having the same frequency as the first excitation light beam and having a polarization angle that is orthogonal to the first excitation light beam;
a first phase modulator configured to phase-modulate the first excitation light beam such that the first excitation light beam and the second excitation light beam have opposite phases;
a second phase modulator configured to phase-modulate the second excitation light beam such that the first excitation light beam and the second excitation light beam have opposite phases;
a combiner configured to combine the phase-modulated first excitation light beam and second excitation light beam to generate a third excitation light beam;
a first divider configured to divide the third excitation light beam into a first polarization component and a second polarization component that are orthogonal to each other;
a second divider configured to divide a signal light beam into a third polarization component and a fourth polarization component that are orthogonal to each other;
a first polarization adjustor configured to adjust a polarization angle of the first polarization component to 45 degrees or 135 degrees with respect to a polarization angle of the third polarization component;
a second polarization adjustor configured to adjust a polarization angle of the second polarization component to 45 degrees or 135 degrees with respect to a polarization angle of the fourth polarization component; and
a nonlinear medium configured to generate four-wave mixing of the first polarization component whose polarization angle is adjusted and the third polarization component, generating a first idler light beam having a frequency corresponding to a difference between frequencies of the signal light beam, and the first excitation light beam and the second excitation light beam from the third polarization component, and to generate four-wave mixing of the second polarization component whose polarization angle is adjusted and the fourth polarization component, generating a second idler light beam having a frequency corresponding to a difference between frequencies of the signal light beam, and the first excitation light beam and the second excitation light beam from the fourth polarization component.

6. A transmission device comprising:
a first wavelength multiplexer configured to wavelength-multiplex a plurality of optical signals to generate a first wavelength-multiplexed light beam in a first wavelength band;
a second wavelength multiplexer configured to wavelength-multiplex a plurality of optical signals to generate a second wavelength-multiplexed light beam in the first wavelength band;
a wavelength converter configured to convert the wavelength band of the first wavelength-multiplexed light beam into a second wavelength band other than the first wavelength band; and
a combiner configured to combine the first wavelength-multiplexed light beam and the second wavelength-multiplexed light beam in the second wavelength band into combined light, and output the combined light to a transmission line, wherein
the wavelength converter includes:
a light source configured to output an excitation light beam;
a modulator configured to phase-modulate the excitation light beam;
a polarization adjustor configured to adjust a polarization angle of the excitation light beam to 45 degrees or 135 degrees with respect to a polarization angle of the first wavelength-multiplexed light beam; and a nonlinear medium configured to generate four-wave mixing of the excitation light beam whose polarization angle is adjusted and the first wavelength-multiplexed light beam, generating an idler light beam having a frequency corresponding to a difference between frequencies of the first wavelength-multiplexed light beam and the excitation light beam from the first wavelength-multiplexed light beam in the first wavelength band, as the first wavelength-multiplexed light beam in the second wavelength band.

7. The transmission device according to claim 6, wherein the wavelength converter includes:

a polarization divider configured to divide the excitation light beam whose polarization angle is adjusted into two polarization components that are orthogonal to each other;

a delay device configured to delay one of the two polarization components with respect to the other such that the two polarization components have opposite phases; and a polarization combiner configured to combine the two polarization components having opposite phases, wherein the nonlinear optical medium generates four-wave mixing of combined light inputted from the polarization combiner and the signal light beam.

8. The transmission device according to claim 6, wherein the wavelength converter includes a first filter configured to remove the excitation light beam from light outputted from the nonlinear optical medium.

9. The transmission device according to claim 6, wherein the wavelength converter includes a second filter configured to remove the signal light beam from light outputted from the nonlinear optical medium.

10. A transmission device comprising:

a first wavelength multiplexer configured to wavelength-multiplex a plurality of optical signals to generate a first wavelength-multiplexed light beam in a first wavelength band;

a second wavelength multiplexer configured to wavelength-multiplex a plurality of optical signals to generate a second wavelength-multiplexed light beam in the first wavelength band;

a wavelength converter configured to convert the wavelength band of the first wavelength-multiplexed light beam into a second wavelength band other than the first wavelength band; and a combiner configured to combine the first wavelength-multiplexed light beam and the second wavelength-multiplexed light beam in the second wavelength band into combined light, and output the combined light to a transmission line, wherein the wavelength converter includes:

a light source configured to output an excitation light beam;

a modulator configured to phase-modulate the excitation light beam;

a first divider configured to divide the excitation light beam into a first polarization component and a second polarization component that are orthogonal to each other;

a second divider configured to divide the first wavelength-multiplexed light beam into a third polarization component and a fourth polarization component that are orthogonal to each other;

a first polarization adjustor configured to adjust a polarization angle of the first polarization component to 45 degrees or 135 degrees with respect to a polarization angle of the third polarization component;

a second polarization adjustor configured to adjust a polarization angle of the second polarization component to 45 degrees or 135 degrees with respect to a polarization angle of the fourth polarization component; and a nonlinear medium configured to generate four-wave mixing of the first polarization component whose polarization angle is adjusted and the third polarization component, generating a first idler light beam having a frequency corresponding to a difference between frequencies of the first wavelength-multiplexed light beam and the excitation light beam from the third polarization component, and to generate four-wave mixing of the second polarization component whose polarization angle is adjusted and the fourth polarization component, generating a second idler light beam having a frequency corresponding to a difference between frequencies of the first wavelength-multiplexed light beam and the excitation light beam from the fourth polarization component, wherein the first idler light beam and the second idler light beam are combined to generate the first wavelength-multiplexed light beam in the second wavelength band.

11. A transmission device comprising:

a first wavelength multiplexer configured to wavelength-multiplex a plurality of optical signals to generate a first wavelength-multiplexed light beam in a first wavelength band;

a second wavelength multiplexer configured to wavelength-multiplex a plurality of optical signals to generate a second wavelength-multiplexed light beam in the first wavelength band;

a wavelength converter configured to convert the wavelength band of the first wavelength-multiplexed light beam into a second wavelength band other than the first wavelength band; and a combiner configured to combine the first wavelength-multiplexed light beam and the second wavelength-multiplexed light beam in the second wavelength band into combined light, and output the combined light to a transmission line, wherein the wavelength converter includes:

a first light source configured to output a first excitation light beam;

a second light source configured to output a second excitation light beam having the same frequency as the first excitation light beam and having a polarization angle that is orthogonal to the first excitation light beam;

a first phase modulator configured to phase-modulate the first excitation light beam such that the first excitation light beam and the second excitation light beam have opposite phases;

a second phase modulator configured to phase-modulate the second excitation light beam such that the first excitation light beam and the second excitation light beam have opposite phases;

a combiner configured to combine the phase-modulated first excitation light beam with second excitation light beam to generate a third excitation light beam;

a first divider configured to divide the third excitation light beam into a first polarization component and a second polarization component that are orthogonal to each other;
a second divider configured to divide the first wavelength-multiplexed light beam into a third polarization component and a fourth polarization component that are orthogonal to each other;
a first polarization adjustor configured to adjust a polarization angle of the first polarization component to 45 degrees or 135 degrees with respect to a polarization angle of the third polarization component;
a second polarization adjustor configured to adjust a polarization angle of the second polarization component to 45 degrees or 135 degrees with respect to a polarization angle of the fourth polarization component; and
a nonlinear medium configured to generate four-wave mixing of the first polarization component whose polarization angle is adjusted and the third polarization component, generating a first idler light beam having a frequency corresponding to a difference between frequencies of the first wavelength-multiplexed light beam, and the first excitation light beam and the second excitation light beam from the third polarization component, and to generate four-wave mixing of the second polarization component whose polarization angle is adjusted and the fourth polarization component, generating a second idler light beam having a frequency corresponding to a difference between frequencies of the first wavelength-multiplexed light beam, and the first excitation light beam and the second excitation light beam from the fourth polarization component, wherein
the first idler light beam and the second idler light beam are combined to generate the first wavelength-multiplexed light beam in the second wavelength band.

12. A transmission system comprising:
a transmission device and a reception device that are interconnected via a transmission line, wherein
the transmission device includes:
a first generation part and a second generation part configured to wavelength-multiplex a plurality of optical signals to generate a first wavelength-multiplexed light beam and a second wavelength-multiplexed light beam in a first wavelength band;
a first wavelength conversion part configured to convert the wavelength band of the first wavelength-multiplexed light beam into a second wavelength band other than the first wavelength band; and
a combination part configured to combine the first wavelength-multiplexed light beam and the second wavelength-multiplexed light beam in the second wavelength band into combined light and output the combined light to the transmission line,
the first wavelength conversion part includes:
a first light source configured to output a first excitation light beam;
a first modulation part configured to phase-modulate the first excitation light beam;
a first polarization adjustment part configured to adjust a polarization angle of the first excitation light beam to 45 degrees or 135 degrees with respect to a polarization angle of the first wavelength-multiplexed light beam; and
a first nonlinear optical medium configured to generate four-wave mixing of the first excitation light beam whose polarization angle is adjusted and the first wavelength-multiplexed light beam, generating an idler light beam having a frequency corresponding to a difference between frequencies of the first wavelength-multiplexed light beam and the first excitation light beam from the first wavelength-multiplexed light beam, as the first wavelength-multiplexed light beam in the second wavelength band,
the reception device includes:
a separation part configured to separate the combined light inputted from the transmission line into the first wavelength-multiplexed light beam and the second wavelength-multiplexed light beam;
a second wavelength conversion part configured to convert the wavelength band of the first wavelength-multiplexed light beam into the first wavelength band; and
a first wavelength division part and a second wavelength division part configured to divide the first wavelength-multiplexed light beam and the second wavelength-multiplexed light beam in the first wavelength band into the plurality of optical signals, and
the second wavelength conversion part includes:
a second light source configured to output a second excitation light beam;
a second modulation part configured to phase-modulate the second excitation light beam;
a second polarization adjustment part configured to adjust a polarization angle of the second excitation light beam to 45 degrees or 135 degrees with respect to a polarization angle of the first wavelength-multiplexed light beam; and
a second nonlinear optical medium configured to generate four-wave mixing of the second excitation light beam whose polarization angle is adjusted and the first wavelength-multiplexed light beam, generating an idler light beam having a frequency corresponding to a difference between frequencies of the first wavelength-multiplexed light beam and the second excitation light beam from the first wavelength-multiplexed light beam, as the second wavelength-multiplexed light beam in the first wavelength band.

* * * * *